US00RE39382E

(19) United States
(12) Reissued Patent
Kamimura et al.

(10) Patent Number: US RE39,382 E
(45) Date of Reissued Patent: Nov. 7, 2006

(54) LUBRICATING OIL COMPOSITION FOR HIGH-TEMPERATURE USE

(75) Inventors: Hideto Kamimura, Ichihara (JP); Hiroshi Nagakawa, Ichihara (JP)

(73) Assignee: Idemitsu Kosan Co., Ltd., Tokyo (JP)

(21) Appl. No.: 10/703,025

(22) PCT Filed: Dec. 22, 1999

(86) PCT No.: PCT/JP99/07202

§ 371 (c)(1),
(2), (4) Date: Jun. 21, 2001

(87) PCT Pub. No.: WO00/39256

PCT Pub. Date: Jul. 6, 2000

Related U.S. Patent Documents

Reissue of:
(64) Patent No.: 6,465,400
Issued: Oct. 15, 2002
Appl. No.: 09/857,199
Filed: Jun. 21, 2001

(30) Foreign Application Priority Data

Dec. 28, 1998 (JP) ..... 10-370481

(51) Int. Cl.
*C10M 105/32* (2006.01)
*C10M 107/02* (2006.01)

(52) U.S. Cl. ..... 508/378; 508/480; 508/481; 508/482; 508/591

(58) Field of Classification Search ..... 508/480, 508/481, 482, 378
See application file for complete search history.

(56) References Cited

U.S. PATENT DOCUMENTS 3,334,046 A * 8/1967 Dexter et al. ..... 508/257
3,947,369 A * 3/1976 Leibfried ..... 508/481
4,466,895 A * 8/1984 Schroeck ..... 508/368
4,589,990 A * 5/1986 Zehler et al. ..... 508/481
5,068,049 A * 11/1991 Hatano et al. ..... 508/481
5,288,432 A * 2/1994 Jung ..... 508/440
5,360,562 A 11/1994 Chrisope et al.
5,580,483 A * 12/1996 Hamid ..... 508/480
6,235,691 B1 * 5/2001 Boffa et al. ..... 508/482

FOREIGN PATENT DOCUMENTS

| | | | |
|---|---|---|---|
| EP | 0 157583 | * | 10/1985 |
| EP | 0 206280 | * | 12/1986 |
| EP | 790294 | * | 1/1997 |
| JP | 57-135897 | * | 8/1982 |
| JP | 01182396 | * | 7/1989 |
| JP | 5-279684 | * | 10/1993 |
| JP | 8-283767 | * | 10/1996 |
| WO | WO 97/34970 | * | 9/1997 |

* cited by examiner

*Primary Examiner*—Ellen M. McAvoy
(74) *Attorney, Agent, or Firm*—Oblon, Spivak, McClelland, Maier & Neustadt, P.C.

(57) ABSTRACT

The present invention relates to a lubricant composition for a high temperature of which the amount evaporated in a thin film at a high temperature is controlled and of which the fluidity is maintained for a long period of time, and it is a lubricant composition for a high temperature which is obtained by mixing a base oil composition comprising (a) 20 to 100% by weight of a specific aromatic ester and (b) 0 to 80% by weight of another base oil with (c) 0.1 to 10% by weight, based on the total amount of the lubricant composition, of an antioxidant.

21 Claims, No Drawings

LUBRICATING OIL COMPOSITION FOR HIGH-TEMPERATURE USE

Matter enclosed in heavy brackets [ ] appears in the original patent but forms no part of this reissue specification; matter printed in italics indicates the additions made by reissue.

TECHNICAL FIELD

The present invention relates to a lubricant composition for a high temperature. More specifically, it relates to a lubricant composition for a high temperature which is used in a chain, a roller chain, a chain conveyor, a bearing and the like.

BACKGROUND OF THE INVENTION

Since a lubricant which is used ina chain, a roller chain, a chain conveyor, a bearing and the like is exposed to a high temperature, an amount of a lubricant evaporated greatly influences a life of an apparatus. Thus, a lubricant loses an ordinary viscosity under a condition of a high temperature and becomes a thin film, so that an amount of a lubricant evaporated has to be controlled under severer conditions. As an ordinary lubricant for a high temperature, high-molecular oil with a high viscosity has been used to control an amount evaporated. Although an amount of such oil evaporated is small, a power loss is great, and it is undesirable in view of a total performance of a lubricant. Further, when such oil is exposed to a thin film and a high temperature, a residual amount is large, but it is solidified. Not only are characteristics as a liquid lost, but also it becomes a solidified sludge to prevent flow of oil, inviting poor lubrication of a lubricating portion. Accordingly, a lubricant for a high temperature of which the amount evaporated in a thin film at a high temperature is controlled and of which the fluidity is maintained for a long period of time has been in demand.

From this standpoint, the present invention has been made, and it aims to provide a lubricant composition for a high temperature of which the amount evaporated in a thin film at a high temperature is controlled and of which the fluidity is maintained for a long period of time.

DISCLOSURE OF THE INVENTION

The present inventors have assiduously conducted investigations, and have consequently found that the aim of the present invention can be achieved by using a specific aromatic ester compound as base oil. This finding has led to the completion of the present invention.

That is, the gist of the present invention is as follows.

(1) A lubricant composition for a high temperature which is obtained by mixing a base oil composition comprising (a) 20 to 100% by weight of an aromatic ester compound represented by the following general formula (I)

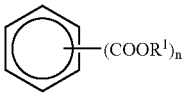

(I)

(wherein $R^1$ represents an alkyl group having 6 to 16 carbon atoms, and n represents an integer of 1 to 6) and (b) 0 to 80% by weight of another base oil with (c) 0.1 to 10% by weight, based on the total amount of the lubricant composition, of an antioxidant.

(2) The lubricant composition for the high temperature as recited in the above (1), wherein the base oil composition comprises (a) 30 to 80% by weight of the aromatic ester compound and (b) 20 to 70% by weight of another base oil.

(3) The lubricant composition for the high temperature as recited in the above (1) or (2), wherein the aromatic ester compound (a) is one selected from a trimellitic acid alkyl ester and a pyromellitic acid alkyl ester.

(4) The lubricant composition for the high temperature as recited in any of the above (1) to (3), wherein another base oil (b) is one type or two or more types selected from an α-olefin oligomer, an ethylene-α-olefin oligomer, polybutene and hydrogenated substances thereof.

(5) The lubricant composition for the high temperature as recited in any of the above (1) to (4), wherein the antioxidant (c) is one containing sulfur and/or phosphorus in a molecule.

(6) The lubricant composition for the high temperature as recited in any of the above (1) to (5), wherein the antioxidant is one selected from a dithiophosphoric acid salt and a thiophosphoric acid ester.

(7) The lubricant composition for the high temperature as recited in any of the above (1) to (5), wherein the antioxidant is 2,6-di-tert-butyl-4-(4,6-bis(octylthio)-1,3,5-triazin-2-ylamino)phenol.

BEST MODE FOR CARRYING OUT THE INVENTION

The mode for carrying out the present invention is described below.

The base oil composition constituting the lubricant composition for the high temperature in the present invention comprises (a) 20 to 100% by weight of the aromatic ester compound represented by the above general formula (I) and (b) 0 to 80% by weight of another base oil.

With respect to the aromatic carboxylic acid constituting the aromatic ester compound as component (a), the number of carboxylic acids bound to benzene is preferably 3 or 4. Among others, trimellitic acid and pyromellitic acid are preferable. As an aliphatic alcohol used in the aromatic carboxylic acid ester, a linear or branched alcohol having 6 to 16 carbon atoms is preferable. Specific examples thereof can include tri-n-hexyl trimellitate, tri-2-ethylhexyl trimellitate, tri-n-octyl trimellitate, tri-3,5,5-trimethylhexyl trimellitate, tetra-n-hexyl pyromellitate, tetra-2-ethylhexyl pyromellitate, tetra-n-octyl pyromellitate, tetra-3,5,5-trimethylhexyl pyromellitate and the like. Incidentally, the aromatic carboxylic acid esters may be used either singly or in admixture of two or more types, and a partial ester may be contained in a full ester.

As another base oil (b), any mineral oil type or synthetic oil type that is used as base oil of ordinary equipment oil can be used. As the mineral oil-type base oil, for example, refined oil which is formed by refining a lubricant fraction resulting from atmospheric distillation or vacuum distillation of paraffin base crude oil, intermediate base crude oil or naphthene base crude oil by an ordinary method such as solvent deasphalting, solvent extraction, hydrocracking, solvent dewaxing, catalytic dewaxing, hydrogenation refining, sulfuric acid treatment, clay treatment or the like.

Further, as the synthetic oil-type base oil, various substances such as an α-olefin oligomer, an ethylene-α-oligomer, a polybutene, a dibasic acid ester, a polyalkylene glycol, a hindered ester, an alkylbenzene, an alkylnaphthalene, a polyether and the like can be used. Of these, an α-olefin oligomer, an ethylene-α-oligomer, a polybutene or hydrogenated substances thereof are preferable because the fluidity can be maintained for a long period of time. Incidentally, as component (b), one type or a mixture of two or more types may be used, and a mixture of mineral oil and synthetic oil may be used.

The proportions of the aromatic carboxylic acid ester (a) and another base oil (b) are that component (a) is 20 to 100% by weight and component (b) is 0 to 80% by weight, and preferably component (a) is 30 to 80% by weight and component (b) is 20 to 70% by weight. When component (a) is less than 20% by weight, the effect of the invention is not provided.

Next, with respect to the antioxidant as component (c) mixed with base oil, an amine-type antioxidant and a phenolic antioxidant can be used. In view of the effect, an antioxidant containing sulfur and/or phosphorus in a molecule is preferable.

Examples of the amine-type antioxidant include monoalkyldiphenylamines such as monooctyldiphenylamine, monononyldiphenylamine and the like; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine and the like; polyalkyldiphenylamines such as tetrabutyldiphenylamine, tetrahexyldiphenylamine, tetraoctyldiphenylamine, tetranonyldiphenylamine and the like; and naphthylamines such as α-naphthylamine, phenyl-α-naphthylamine, butylphenyl-α-naphthylamine, pentylphenyl-α-naphthylamine, hexylphenyl-α-naphthylamine, heptylphenyl-α-naphthylamine, octylphenyl-α-naphthylamine, nonylphenyl-α-naphthylamine and the like.

Examples of the phenolic antioxidant can include monophenols such as 2,6-di-tert-butyl-4-methylphenol, 2,6-di-tert-butyl-4-ethylphenol and the like; and diphenols such as 4,4'-methylenebis(2,6-di-tert-butylphenol), 2,2'-methylenebis(4-ethyl-6-tert-butylphenol) and the like.

Examples of the antioxidant containing sulfur and/or phosphorus in the molecule can be an additive containing sulfur and/or phosphorus in a molecule and having an antioxidant ability, and it may be added for the other purpose.

First, the antioxidant containing sulfur in the molecule is described. For example, sulfurized oil, sulfurized mineral oil, a sulfurized fatty acid, a sulfurized ester, a sulfurized olefin, dihydrocarbyl polysulfide, a thiadiazole compound, an alkylthiocarbamoyl compound, a triazine compound, a thioterpene compound, a dialkylthiodipropionate compound and the like can be mentioned.

Here, sulfurized oil is oil obtained by reacting sulfur or a sulfur-containing compound with oil (lard, whale oil, vegetable oil, fish oil or the like), and the sulfur content is not particularly limited. Generally, it is preferably between 5 and 30% by weight. Specific examples thereof include sulfurized lard, sulfurized rapeseed oil, sulfurized castor oil, sulfurized soybean oil, sulfurized rice bran oil and the like. Examples of the sulfurized fatty acid include sulfurized oleic acid and the like. Examples of the sulfurized ester include sulfurized oleic acid methyl ester, sulfurized rice bran fatty acid octyl ester and the like.

As the sulfurized olefin, for example, a compound represented by the following general formula (II)

$$R^2—S_a—R^3 \quad \text{(II)}$$

(wherein $R^2$ represents an alkenyl group having 2 to 15 carbon atoms, $R^3$ represents an alkyl group or an alkenyl group having 2 to 15 carbon atoms, and a represents an integer of 1 to 8).

This compound is obtained by reacting an olefin having 2 to 15 carbon atoms or its dimer to tetramer with a sulfurizing agent such as sulfur, sulfur chloride or the like. As the olefin, propylene, isobutene, diisobutene or the like is preferable.

Further, the dihydrocarbyl polysulfide is a compound represented by the following general formula (III)

$$R^4—S_b—R^5 \quad \text{(III)}$$

(wherein $R^4$ and $R^5$ each represent an alkyl group or a cyclic alkyl group having 1 to 20 carbon atoms, an aryl group having 6 to 20 carbon atoms, an alkylaryl group having 7 to 20 carbon atoms or an arylalkyl group having 7 to 20 carbon atoms, and these may be the same or different, and b represents an integer of 2 to 8).

When $R^4$ and Rs therein are alkyl groups, it is called an alkyl sulfide.

Specific examples of $R^4$ and $R^5$ in the above general formula (III) include a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, various dodecyl groups, a cyclohexyl group, a cyclooctyl group, a phenyl group, a naphthyl group, a tolyl group, a xylyl group, a benzyl group, a phenetyl group and the like.

Preferable examples of the dihydrocarbyl polysulfide include dibenzyl polysulfide, various dinonyl polysulfides, various didodecyl polysulfides, various dibutyl polysulfides, various dioctyl polysulfides, diphenyl polysulfide, dicyclohexyl polysulfide and the like.

As the thiadiazole compound, for example, 1,3,4-thiadiazole and 1,2,4-thiadiazole compounds represented by the following general formulas (IV)

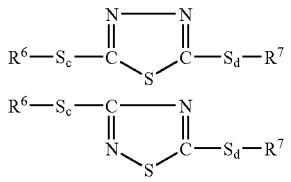

(IV)

(wherein $R^6$ and $R^7$ each represent a hydrogen atom or a hydrocarbon group having 1 to 20 carbon atoms, and c and d each represent an integer of 0 to 8)

are preferably used.

Specific examples of the thiadiazole compounds can include 2,5-bis(n-hexyldithio)-1,3,4-thiadiazole, 2,5-bis(n-octyldithio)-1,3,4-thiadiazole, 2,5-bis(n-nonyldithio)-1,3,4-thiadiazole, 2,5-bis(1,1,3,3-tetramethylbutyldithio)-1,3,4-thiadiazole, 3,5-bis(n-hexyldithio)-1,2,4-thiadiazole, 3,5-bis(n-octyldithio)-1,2,4-thiadiazole, 3,5-bis(n-nonyldithio)-1,2,4-thiadiazole, 3,5-bis(1,1,3,3-tetramethylbutyldithio)-1,2,4-thiadiazole and the like.

As the alkylthiocarbamoyl compound, for example, a compound represented by the following general formula (V)

(V)

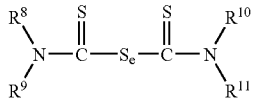

(wherein $R^8$ to $R^{11}$ each represent an alkyl group having 1 to 20 carbon atoms, and e represents an integer of 1 to 8)

can preferably be used.

Specific examples of the alkylthiocarbamoyl compound include bis(dimethylthiocarbamoyl) monosulfide, bis(dibutylthiocarbamoyl) monosulfide, bis(dimethylthiocarbamoyl) disulfide, bis(dibutylthiocarbamoyl) disulfide, bis(diamylthiocarbamoyl) disulfide, bis(dioctylthiocarbamoyl) disulfide and the like.

Preferable examples of the triazine compound include 2,6-di-tert-butyl-4-(4,6-bis(octylthio)-1,3,5-triazin-2-ylamino)phenol and the like.

Further, examples of the thioterpene compound include a reaction product of phosphorus pentasulfide and pinene. Examples of the dialkylthiodipropionate compound include dilaurylthiodipropionate, distearylthiodipropionate and the like.

Further, as the antioxidant containing sulfur and a metal, a zinc dialkyldithiocarbamate (Zn-DTC), a molybdenum dialkyldithiocarbamate (Mo-DTC), a lead dialkyldithiocarbamate, a tin dialkyldithiocarbamate, sodium sulfonate, calcium sulfonate and the like can also be used.

Next, the antioxidant containing phosphorus in the molecule is described. Typical examples include phosphoric acid esters and amine salts thereof.

The phosphoric acid esters include a phosphoric acid ester, an acid phosphoric acid ester, a phosphorous acid ester and an acid phosphorous acid ester represented by the following general formulas (VI) to (X).

(VI)

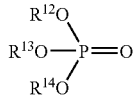

(VII)

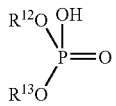

(VIII)

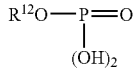

(IX)

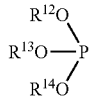

(X)

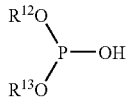

In the general formulas (VI) to (X), $R^{12}$ to $R^{14}$ each represent an alkyl group, an alkenyl group, an alkylaryl group and an arylalkyl group having 4 to 30 carbon atoms, and $R^{12}$ to $R^{14}$ may be the same or different.

The phosphoric acid ester includes a triaryl phosphate, a trialkyl phosphate, a trialkylaryl phosphate, a triarylalkyl phosphate, a trialkenyl phosphate and the like. Specific examples thereof include triphenyl phosphate, tricresyl phosphate, benzyldiphenyl phosphate, ethyldiphenyl phosphate, tributyl phosphate, ethyldibutyl phosphate, cresyldiphenyl phosphate, dicresylphenyl phosphate, ethylphenyldiphenyl phosphate, diethylphenylphenyl phosphate, propylphenyldiphenyl phosphate, dipropylphenylphenyl phosphate, triethylphenyl phosphate, tripropylphenyl phosphate, butylphenyldiphenyl phosphate, dibutylphenylphenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, trioleyl phosphate and the like.

Specific examples of the acid phosphoric acid ester include 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, isostearyl acid phosphate and the like.

Specific examples of the phosphorous acid ester include triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenylisodecyl phosphite, tristearyl phosphite, trioleyl phosphite and the like.

Specific examples of the acid phosphorous acid ester include dibutylhydrogen phosphite, dilaurylhydrogen phosphite, dioleylhydrogen phosphite, distearylhydrogen phosphite, diphenylhydrogen phosphite and the like.

Further, the amines forming amine salts with these include a mono-substituted amine, a di-substituted amine and a tri-substituted amine represented by the general formula (XI)

$$R^{15}{}_m NH_{3-m} \quad \text{(XI)}$$

(wherein $R^{15}$ represents an alkyl group or an alkenyl group having 3 to 30 carbon atoms, an aryl group or an arylalkyl group having 6 to 30 carbon atoms or a hydroxyalkyl group having 2 to 30 carbon atoms, m represents 1, 2 or 3, and when $R^{15}$ is plural groups, plural $R^{15}$'s may be the same or different).

In $R^{15}$ in the general formula (XI), an alkyl group or an alkenyl group having 3 to 30 carbon atoms may be linear, branched or cyclic.

Here, examples of the mono-substituted amine can include butylamine, pentylamine, hexylamine, cyclohexylamine, octylamine, laurylamine, stearylamine, oleylamine, benzylamine and the like. Examples of the di-substituted amine can include dibutylamine, dipentylamine, dihexylamine, dicyclohexylamine, dioctylamine, dilaurylamine, distearylamine, dioleylamine, dibenzylamine, stearyl-monoethanolamine, decyl-monoethanolamine, hexyl-monopropanolamine, benzyl-monoethanolamine, phenyl-monoethanolamine, tolyl-monopropanol amide and the like. Examples of the tri-substituted amine include tributylamine, tripentylamine, trihexylamine, tricyclohexylamine, trioctylamine, trilaurylamine, tristearylamine, trioleylamine, tribenzylamine, dioleyl-monoethanolamine, dilauryl monopropanolamine, dioctyl-monoethanolamine, dihexyl-monopropanolamine, dibutyl-monopropanolamine, oleyl-diethanol amine, stearyl-dipropanolamine, lauryl-diethanolamine, octyl-dipropanolamine, butyl-diethanolamine, benzyl-diethanolamine, phenyldiethanolamine, tolyl-dipropanolamine, xylyl-diethanolamine, triethanolamine, tripropanolamine and the like.

Examples of the antioxidant containing phosphorus and a halogen atom can include a chlorinated phosphoric acid ester.

Examples of the antioxidant containing sulfur and phosphorus in the molecule can include phosphorus sulfide oil, a phosphorus sulfide olefin, a thiophosphoric acid ester (thiophosphite and thiophosphate) and the like. Of these, a thiophosphite (alkylaryl type) and a thiophosphate (alkylaryl type) are preferable.

Examples of the antioxidant containing sulfur, phosphorus and a metal can include dithiophosphoric acid salts such as zinc dithiophosphate (Zn-DTP), molybdenum dithiophosphate (Mo-DTP), lead dithiophosphate, tin dithiophosphate and the like.

Among the above-described antioxidants, 2,6-tert-butyl-4-(4,6-bis(octylthio)-1,3,5-triazin-2-ylamino)phenol, Zn-DTP(alkylaryl type), a thiophosphite (alkyl type) and a thiophosphate (alkylaryl type) are preferable.

Further, the above-described antioxidants can be used either singly or in combination.

The preferable mixing amount of the above antioxidant is in the range of 0.1 to 10% by weight based on the total amount of the composition. When the mixing amount is less than 0.1% by weight, the aim of the present invention is not fully exhibited. When it exceeds 10% by weight, the improvement in the effect is sometimes not observed even with this amount, and the solubility in base oil is sometimes decreased. The more preferable mixing amount is in the range of 1 to 7% by weight.

The lubricant composition for the high temperature in the present invention can contain various known additives such as a rust-proofing agent, a detergent-dispersant, a metal inactivator, a defoamer and the like as required unless the aim of the present invention is impaired.

Examples of the rust-proofing agent can include a metal sulfonate, a succinic acid ester and the like.

Examples of the detergent-dispersant can include a metal sulfonate, a metal salicylate, a metal finate, a succinic acid imide and the like.

Examples of the metal inactivator can include benzotriazole, thiadiazole and the like.

Examples of the defoamer include methyl silicone oil, fluorosilicone oil, a polyacrylate and the like.

It is advisable that the kinematic viscosity at 40° C. of the lubricant composition for the high temperature in the present invention is adjusted to 10 to 50 $mm^2/s$ in order to achieve the aim. It is more preferably in the range of 50 to 320 $mm^2/s$.

Incidentally, the lubricant composition for the high temperature in the present invention is preferably used when the temperature exceeds 150° C. in a time of more than 50% of the use period.

Next, the present invention is illustrated more specifically with reference to Examples. However, the present invention is not limited to these Examples at all.

Examples 1 to 6 and Comparative Examples 1 and 2

As shown in Table 1, base oil was mixed with an antioxidant to prepare a lubricant composition. With respect to the viscosity of the composition, the mixing was conducted by adjusting a viscosity of an α-olefin oligomer, whereby the kinematic viscosity at 40° C. was all adjusted to 220 $mm^2/s$. Regarding the composition, a thin film residue test was conducted in the following manner. Further, a container was inclined, and the fluidity at that time was visually evaluated. The results are shown in Table 1.

Thin film residue test

The amount of the residue was measured at 200° C. for 24 hours using a container and a constant-temperature air bath indicated ina lubricant heat stability test of JIS K2540. This was expressed in terms of percentage, and defined as a residue ratio. By the way, 10 liters/hr of air was always caused to flow in during the measurement.

TABLE 1

| | | Ex. 1 | Ex. 2 | Ex. 3 | Ex. 4 |
|---|---|---|---|---|---|
| | | (1) | | | |
| Mixing ratio wt. % | α-olefin oligomer*1 | balance | balance | balance | balance |
| | polybutene*2 | 20 | 20 | 20 | 20 |
| | aromatic ester 1*3 | 50 | 50 | 50 | 50 |
| | aromatic ester 2*4 | — | — | — | — |
| | bisphenol*5 | 1 | 1 | 1 | 1 |
| | diphenylamine*6 | 1 | 1 | 1 | 1 |
| | dithiophosphoric acid salt*7 | — | 2 | — | — |
| | thiophosphoric acid ester*8 | — | — | 2 | — |
| | triazine-type sulfur-containing compound*9 | — | — | — | 2 |
| Residue ratio (%) | | 62.5 | 70.2 | 67.3 | 76.6 |
| Fluidity (visual observation) | | yes | yes | yes | yes |
| | | Ex. 5 | Ex. 6 | CEx. 1 | CEx. 2 |
| | | (2) | | | |
| Mixing ratio wt. % | α-olefin oligomer*1 | balance | balance | balance | balance |
| | polybutene*2 | 20 | 20 | 20 | 20 |
| | aromatic ester 1*3 | — | — | — | — |
| | aromatic ester 2*4 | 50 | 50 | — | — |
| | bisphenol*5 | 1 | 1 | 1 | 1 |
| | diphenylamine*6 | 1 | 1 | 1 | 1 |
| | dithiophosphoric acid salt*7 | — | 2 | — | 2 |
| | thiophosphoric acid ester*8 | — | 2 | — | 2 |
| | triazine-type sulfur-containing compound*9 | 2 | — | — | — |
| Residue ratio (%) | | 78.1 | 84.1 | 50.6 | 55.2 |
| Fluidity (visual observation) | | yes | yes | no | no |

Ex.—Example, CEx.—Comparative Example (Notes)

*1Hydrogenated substance of an oligomer, 1-decene (kinematic viscosity at 40° C. 30 to 63 $mm^2/s$)

*2Number average molecular weight: 2,300

*3tri-n-ocytl trimellitate

*4tri-n-octyl pyromellitate

*5 4,4'-methylenebis(2,6-di-tert-butylphenol)

*6 4,4'dibutyldiphenylamine

*7alkylaryl-type Zn-DTP

*8triisononylphenol thiophosphate

*9 2,6-di-tert-butyl-4-(4,6-bis(octylthio)-1,3,5-triazin-2-ylamino)phenol

Industrial Applicability

According to the present invention, a lubricant composition for a high temperature of which the amount evaporated in a thin film at a high temperature is controlled and of which the fluidity is maintained for a long period of time can be provided.

What is claimed is:

1. A lubricant composition for a high temperature which is obtained by mixing a base oil composition comprising (a) 20 to 80% by weight of an aromatic ester compound represented by the following general formula (I)

(I)

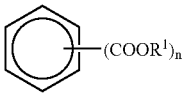

[(] wherein $R^1$ represents an alkyl group having 6 to 16 carbon atoms, and n represents an integer of 1 to 6[)], and (b) 20 to 80% by weight of another base oil with (c) 0.1 to 10% by weight, based on the total amount of the lubricant composition, of an antioxidant, wherein said another base oil includes an α-olefin oligomer, [or hydrogenated products thereof,] or an ethylene-α-olefin oligomer, or hydrogenated products [thereof] *of said ethylene-α-olefin oligomer*.

2. The lubricant composition for the high temperature as claimed in claim 1, wherein the base oil composition comprises (a) 30 to 80% by weight of the aromatic ester compound and (b) 20 to 70% by weight of another base oil.

3. The lubricant composition for the high temperature as claimed in claim 1, wherein the aromatic ester compound (a) is one selected from a trimellitic acid alkyl ester and a pyromellitic acid alkyl ester.

4. The lubricant composition for the high temperature as claimed in claim 1, wherein said another base oil (b) also includes a polybutene or hydrogenated products thereof.

5. The lubricant composition for the high temperature as claimed in claim 1, wherein the antioxidant (c) is one containing sulfur and/or phosphorus in a molecule.

6. The lubricant composition for the high temperature as claimed in claim 1, wherein the antioxidant (c) is one selected from a dithiophosphoric acid salt and a thiophosphoric acid ester.

7. The lubricant composition for the high temperature as claimed in claim 1, wherein the antioxidant (c) is 2,6-di-tert-butyl-4-(4,6-bis(octylthio)-1,3,5-triazin-2-ylamino) phenol.

8. The lubricant composition for the high temperature as claimed in claim 1, wherein n is 3 or 4.

9. The lubricant composition for the high temperature as claimed in claim 1, wherein n is 3.

10. The lubricant composition for the high temperature as claimed in claim 1, wherein n is 4.

*11. A lubricant composition for a high temperature which is obtained by mixing a base oil composition comprising (a) 20 to 80% by weight of an aromatic ester compound represented by the following general formula (I)*

*(I)*

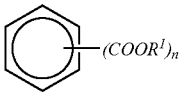

*wherein $R^1$ represents an alkyl group having 6 to 16 carbon atoms, and n represents an integer of 3 to 6, and (b) 20 to 80% by weight of another base oil with (c) 0.1 to 10% by weight, based on the total amount of the lubricant composition, of an antioxidant,*

*wherein said another base oil includes an α-olefin oligomer, or hydrogenated products thereof, or an ethylene-α-olefin oligomer, or hydrogenated products thereof.*

*12. The lubricant composition for the high temperature as claimed in claim 11, wherein the base oil composition comprises (a) 30 to 80% by weight of the aromatic ester compound and (b) 20 to 70% by weight of another base oil.*

*13. The lubricant composition for the high temperature as claimed in claim 11, wherein the aromatic ester compound (a) is one selected from a trimellitic acid alkyl ester and a pyromellitic acid alkyl ester.*

*14. The lubricant composition for the high temperature as claimed in claim 11, wherein said another base oil (b) also includes a polybutene or hydrogenated products thereof.*

*15. The lubricant composition for the high temperature as claimed in claim 11, wherein the antioxidant (c) is one containing sulfur and/or phosphorus in a molecule.*

*16. The lubricant composition for the high temperature as claimed in claim 11, wherein the antioxidant (c) is one selected from a dithiophosphoric acid salt and a thiophosphoric acid ester.*

*17. The lubricant composition for the high temperature as claimed in claim 11, wherein the antioxidant (c) is 2,6-di-tert-butyl-4-(4,6-bis(octylthio)-1,3,5-triazin-2-ylamino) phenol.*

*18. The lubricant composition for the high temperature as claimed in claim 11, wherein n is 3 or 4.*

*19. The lubricant composition for the high temperature as claimed in claim 11, wherein n is 3.*

*20. The lubricant composition for the high temperature as claimed in claim 11, wherein n is 4.*

*21. A lubricant composition for a high temperature which is obtained by mixing a base oil composition comprising (a) 20 to 80% by weight of an aromatic ester compound represented by the following general formula (I)*

*(I)*

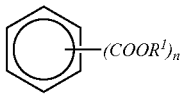

*wherein $R^1$ represents an alkyl group having 6 to 16 carbon atoms, and n represents an integer of 1 to 6, and (b) 20 to 80% by weight of another base oil with (c) 0.1 to 10% by weight, based on the total amount of the lubricant composition, of a zinc dithiophosphoric acid salt antioxidant,*

*wherein said another base oil includes an α-olefin oligomer, or hydrogenated products thereof, or an ethylene-α-olefin oligomer, or hydrogenated products thereof.*

* * * * *